Dec. 3, 1957  P. D. CAPPS ET AL  2,815,111
CONVEYER CENTERING DEVICE
Filed Nov. 3, 1954  3 Sheets-Sheet 1
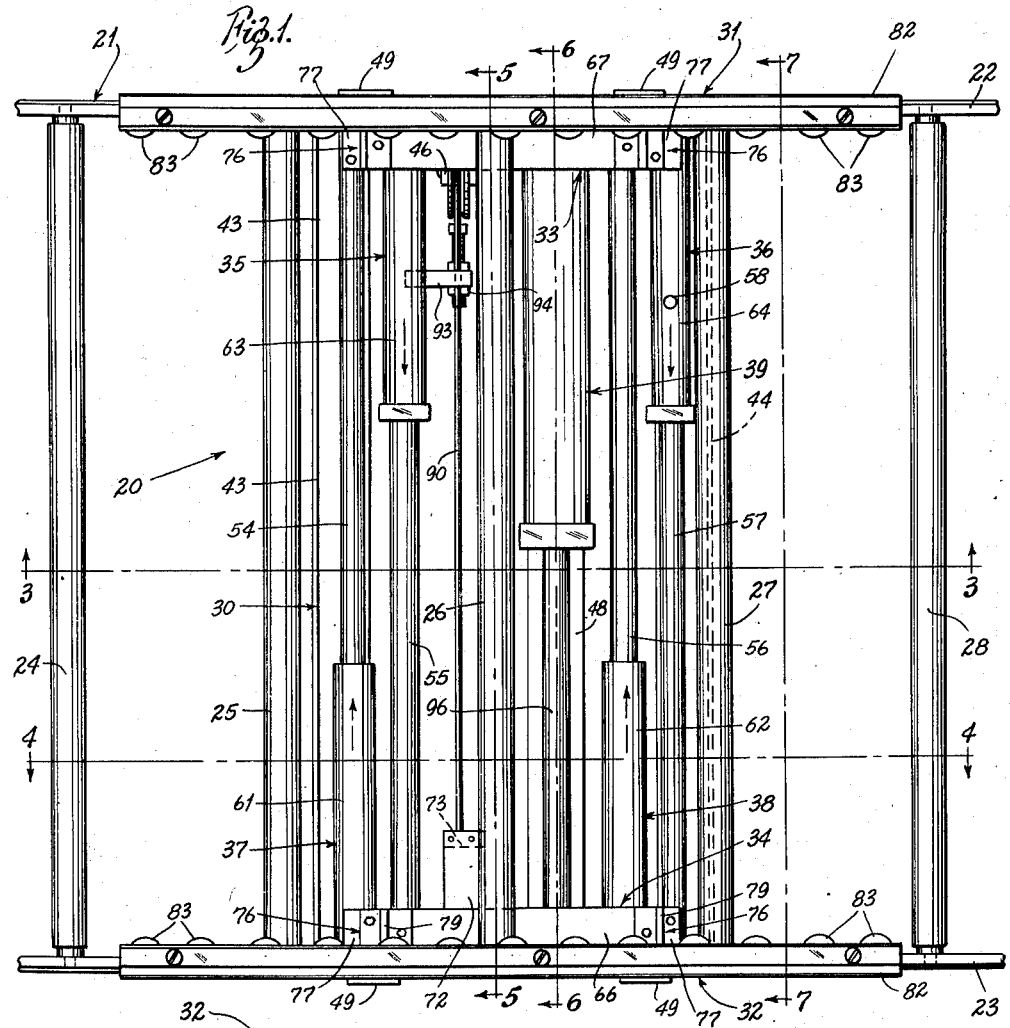
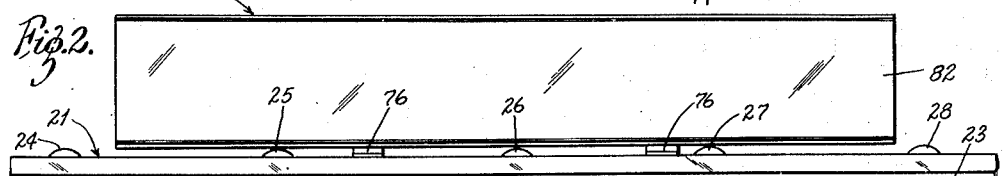
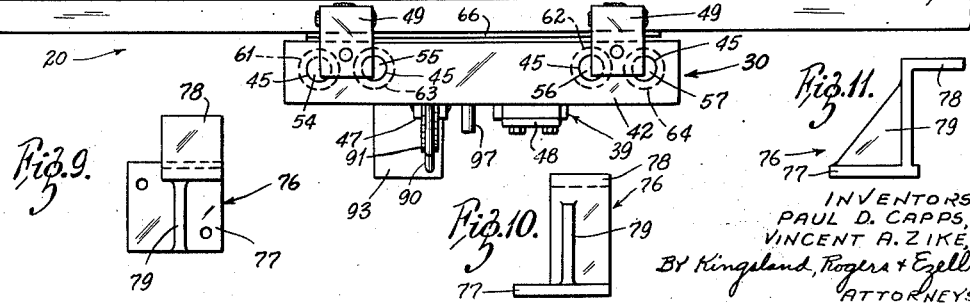
INVENTORS:
PAUL D. CAPPS,
VINCENT A. ZIKE
By Kingsland, Rogers & Ezell
ATTORNEYS

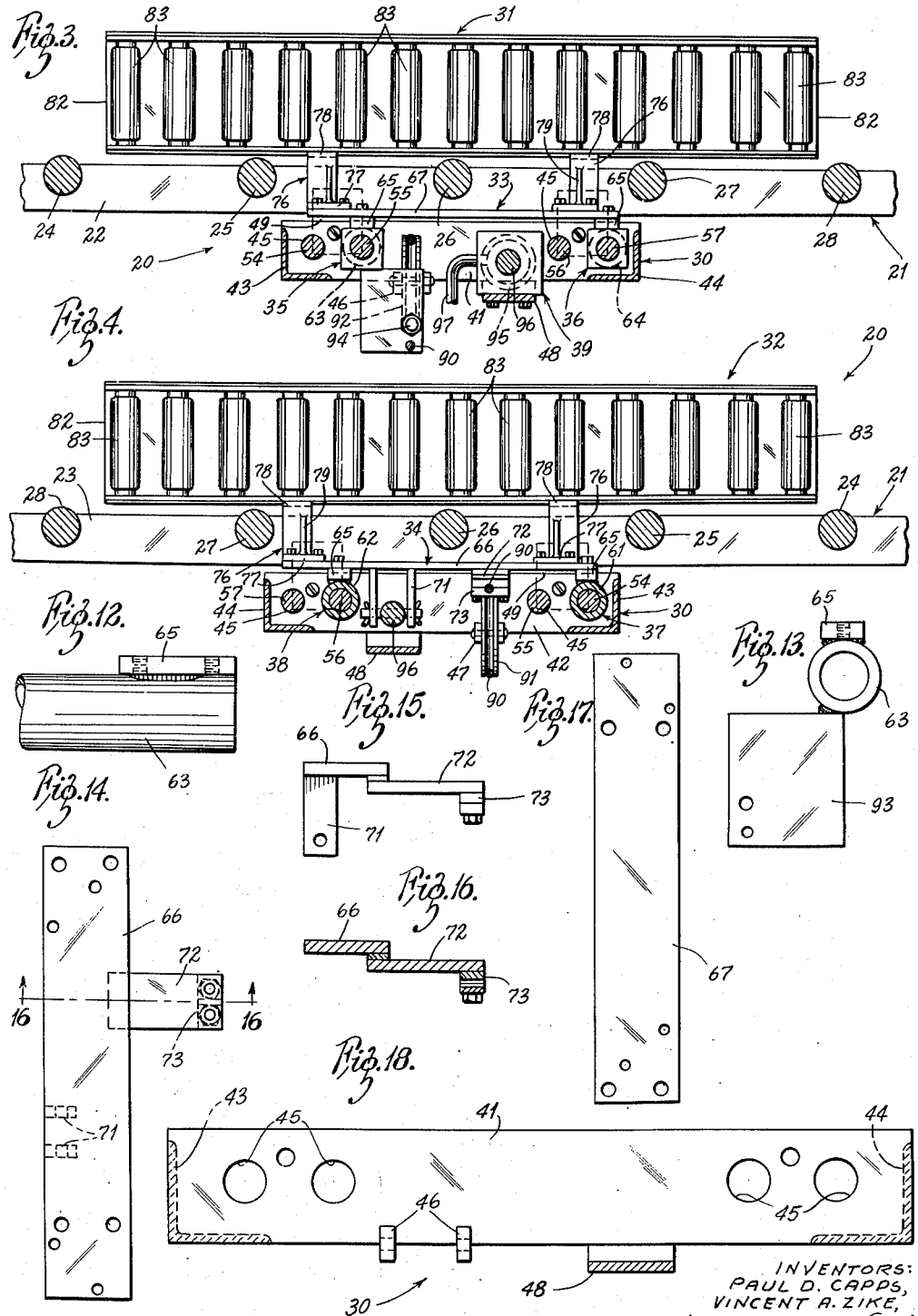

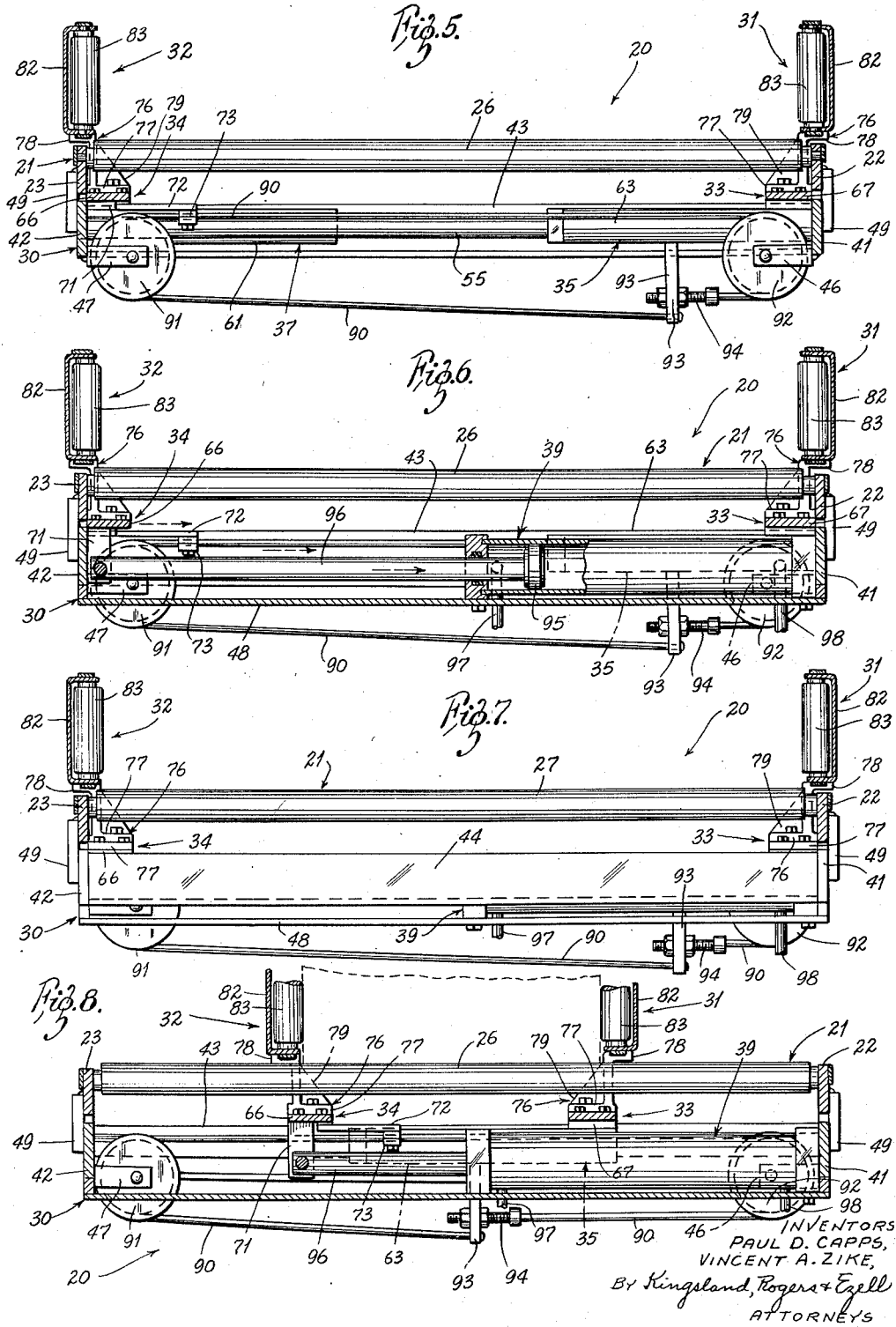

United States Patent Office 2,815,111
Patented Dec. 3, 1957

2,815,111

CONVEYER CENTERING DEVICE

Paul D. Capps and Vincent A. Zike, Herrin, Ill., assignors to International Staple and Machine Company, Herrin, Ill., a corporation of Pennsylvania Application November 3, 1954, Serial No. 466,534

15 Claims. (Cl. 198—29)

This invention relates to improvements in centering devices, and in particular is concerned with a centering device for use on articles carried by conveyers.

By means of this invention, there has been provided a centering device which utilizes one motivating force to effect closed movement of one or both of two opposed centering arms to close upon an article and center it in a desired position. The centering operation is effected by pneumatic means or other fluid actuated mechanism in order to prevent damage to articles and to give the proper control desired. The invention includes a power cylinder which is coupled to one centering arm having adjustable connecting means at one side of a pulley loop. Movement of this coupled centering arm of the device toward the center causes an opposed movement of the second centering arm which is connected to the other side of the pulley loop, effecting the desired centering operation. Where desired, the apparatus may be operated with only the one centering arm connected to the power cylinder and with the second centering arm disconnected from the pulley. Then the first centering arm may be actuated toward the stationary second centering arm which acts as a back rest or guide. Further, it is contemplated that hand movement of the centering arms may be effected with or without the use of the pulleys, if desired, and this may be done by uncoupling the power cylinder or whatever is used as the prime mover.

The opposed movement of the centering arms is made possible by attachment of the two opposed centering arms to bearings which are movable upon slide bars connected to the sides of the conveyer. These bearings are freely movable on the slide bars and, in turn, are connected at their ends to tie rods which support the opposed centering arms so that the bearings and tie rods connected to the centering arms all move together when the device is operated.

In addition, the operating mechanism including the pulley belt connected to the tie rod and the bearing of the centering device is so designed that the centering operation can be varied with the centering being adapted to be effected at any point widthwise upon the conveyer, either in the center, or at a selected point to the left or right thereof.

Accordingly, it is a principal object of this invention to provide a centering device having two opposed centering arms in which one of the arms is adapted to be moved directly, and the other arm is adapted to be locked in a selected position, or can be moved in an opposed direction to the movement of the first arm and in response thereto.

It is a further object of this invention to provide a centering device having two opposed centering arms movable toward one another in which the operation can be effected by the direct movement of only one centering arm.

Yet another object of this invention is to provide a centering device having opposed centering arms in which the centering arms are supported upon movable bearings slidable on slide bars and wherein the bearings are connected to the centering arms.

Still another object of this invention is to provide a centering device in which the movement of opposed arms can be effected to a preselected centering position by adjustment of an operating pulley.

Yet another object of this invention is to provide a centering device which can be utilized in standard conveyers of the roller or belt type or, if desired, upon a flat stationary bed, due to the self-contained nature of the centering device.

Further objects of this invention will be apparent in the detailed description which follows and will be further obvious to those skilled in the art.

For the purpose of description, a typical embodiment of the centering device is shown with a roller conveyer, but it is to be understood that this is for the purpose of example only and that the centering device is of use with other types of conveyers or on a stationary bed frame of any sort.

In the drawings:

Figure 1 is a plan view of the machine in the open stand-by position;

Figure 2 is a front elevation of the machine of Figure 1;

Figure 3 is a sectional view in elevation taken on the line 3—3 of Figure 1;

Figure 4 is a sectional view in elevation taken on the line 4—4 of Figure 1;

Figure 5 is a sectional view in elevation taken across the axis of the machine on the line 5—5 of Figure 1;

Figure 6 is a view similar to Figure 5 but taken on the line 6—6 of Figure 1 showing the power operating piston;

Figure 7 is another view similar to Figure 5, but taken on the line 7—7 of Figure 1;

Figure 8 is a view similar to Figure 6, but shows the machine in the operated position so that the centering arms are relatively close to one another;

Figure 9 is a plan view of an angle iron used for supporting the centering arm of the machine;

Figure 10 is a view in front elevation of the angle iron of Figure 9;

Figure 11 is a view in side elevation of the angle iron;

Figure 12 is a view in side elevation of the end portion of the front bearing assembly;

Figure 13 is a front view of the left rear bearing assembly secured to an anchor plate;

Figure 14 is a plan view of the front tie rod;

Figure 15 is a view in elevation taken from the front of Figure 14 showing the front tie rod;

Figure 16 is a sectional view taken on the line 16—16 of Figure 14;

Figure 17 is a plan view of the rear tie rod; and

Figure 18 is an enlarged view in section of the frame of the centering device shown at the bottom of Figure 3.

Reference will now be had to the drawings, and Figure 1 in particular, showing the centering device generally indicated at 20 incorporated in a roller conveyer 21. The roller conveyer is of conventional form and includes two side bars 22 and 23 to which are connected five rollers 24, 25, 26, 27 and 28.

The main components of the centering device 20 include a frame 30 secured to the roller conveyer as more fully appears in Figure 2, a rear centering arm 31, a front centering arm 32, and rear and front tie rods 33 and 34, respectively, which are connected to the centering arms. Left rear and right rear bearing assemblies 35 and 36 and front bearing assemblies 37 and 38 provide, with a power cylinder 39, the mechanism for effecting the movement of the centering arms toward or away from one another.

The frame 30 is shown in detail in Figure 18 and also appears at the bottom of Figures 2 to 8. It is of generally rectangular configuration wherein rear end plate 41 and front end plates 42 are connected together by angle arms 43 and 44. Both the end plates 41 and 42 are identical in all respects and are further provided with four holes 45 which receive slide bars on which the centering arms are adapted to be moved, as will be more fully described hereinbelow. In addition, the rear end plate is provided with a bracket 46 and the front end plate is provided with a bracket 47, both of which are adapted to have journaled therein pulleys to control the movement of the centering arms.

A strap 48 underlies and connects both of the end plates to provide rigidity thereto and also to support the power cylinder. The end plates are secured to the side bars 22 and 23 of the conveyer by welded plates 49, as is shown in Figure 2.

Four slide bars are secured within the holes 45 of the front and rear end plates of the frame and these slide bars are designated 54, 55, 56 and 57, as shown in Figure 1. Front bearings 61 and 62 are fitted over slide bars 54 and 56, respectively, while a left rear bearing 63 fits over slide bar 55 and right rear bearing 64 fits over slide bar 57. In addition, the right rear bearing 64 is provided with a setscrew lock 58 whereby it may be locked in a desired axial position upon the slide bar 57. As will appear more clearly below, this provides a means for locking the rear centering arm in a stationary or rest position independent of the movement of the front centering arm.

Each one of the bearings is provided at one end with a top plate 65. These plates provide for mounting of a front tie rod 66 upon the ends of bearings 61 and 62 and a rear tie rod 67 upon the bearings 63 and 64.

The front tie rod 66 is shown in more detail in Figures 14, 15 and 16 and is seen to be provided with suitable holes for attachment to the plate 65 on the front bearings. In addition, the front tie rod is provided with a yoke 71 for attachment to a piston rod to be described later. A pulley fastening bar 72 provided with a clamp 73 is also secured to the tie rod.

The rear tie rod 67 is shown in Figure 17 and consists of a metal plate similar to the base of the tie rod 66 and is drilled with suitable holes for attachment to the rear bearing for movement therewith. Likewise, the rear tie rod 67 is provided with holes for attachment to angle irons which support the rear centering arm as is also the front tie rod.

The front and rear centering arms 32 and 31, respectively, are alike in all respects and shown in Figures 1 through 8. For the purpose of description, the front centering arm 32 only will be described. This centering arm includes two angle iron brackets 76 which are shown in detail in Figures 9, 10 and 11. The angle iron 76 comprises a base 77 and centering arm support 78 which are connected together by the web 79. Two of these angle irons are connected at their base to each end of the tie rods 66 and 67.

A roller frame 82 is attached to the portions 78 of the two end brackets on each tie rod and journaled within the roller frame are a number of centering rollers 83 which are identical in all respects. By this structure, both the front centering arm 32 and the rear centering arm 31 are securely mounted upon front tie rod 66 and rear tie rod 67, respectively, for movement therewith.

The motivating force for the front centering arm is the power cylinder 39 which is anchored at its end to the rear end plate 41 of the frame 30, as shown in Figure 6. Situated within the power cylinder 39 is a piston 95 connected at one end of a piston rod 96 which is connected at its other end to the piston rod bracket 71 on the front tie rod 66. Thus, movement of the piston causes movement of the front centering arm upon its slide bars.

The power cylinder 39 is provided with a port 97 at one end and a port 98 at its other end so as to provide, by a suitable valving mechanism, fluid pressure as desired on either side of the piston 95 to effect the movement thereof. It is to be understood that, when a source of fluid pressure is applied to one of the ports, evacuation is effected throughout the other in conventional manner to achieve this motivating operation.

The actuating mechanism for the rear centering arm is a pulley belt 90 which runs around the front pulley wheel 91 and rear pulley wheel 92, respectively. These pulleys are journaled within the pulley brackets 46 of the frame 30, as previously mentioned. The pulley belt 90 is adapted to be securely clamped through clamp 73 of the front tie rod 66, as appears in Figures 4 and 5, so that movement of the front tie rod 66 causes the pulley belt to move.

The pulley belt is also secured at both of its ends to an anchor plate 93 which is welded or otherwise secured to the left rear bearing 63. This anchor plate is further provided with an adjustment screw 94 so that the tension of the pulley belt 90 can be varied. By this anchor plate mechanism, movement of the pulley belt causes movement of the anchor plate 93 and the left rear bearing 63 and its associated rear tie rod 67. By this mechanism, the rear centering arm 31 is moved responsive to movement of the pulley belt.

*Operation*

The normal position of the front and rear centering arms 32 and 31, respectively, in the unoperated position, is that shown in Figures 1 and 5 through 7. This position may be maintained by a source of high fluid pressure being admitted through the port 98 and vacuum or low pressure being applied to the port 97. Once this condition has been achieved, the centering arm will reside in this position. In this state, articles may move on the conveyer rollers past the centering device without interference.

When the conveyer operator desires to have an article such as a carton centered, a switch is actuated which causes valving mechanism to introduce high fluid pressure to the port 97 and the right side of the piston head of the cylinder 39 is evacuated through the port 98. Under this condition, the piston rod 96 moves in the direction of the arrow shown in Figure 6 and causes with this actuation a movement of the front tie rod 66 in the direction of the arrow. As this occurs, the pulley belt 90, because of the clamped connection 73, is also caused to move in the direction of its arrow of Figure 6.

The movement of the pulley belt then causes the simultaneous movement of the anchor plate and through it the left rear bearing 63 in the direction of the arrow shown in Figure 1 so as to oppose the movement of the front tie rod. Both the front centering arm 32 and the rear centering arm 31, as they are attached to their respective tie rods, move toward the center and, as the carton moves therebetween, it is contacted by the rollers of these centering arms.

Since the pressure applied to the port 97 is gauged to the point where it does not injure the carton, the centering arm can close upon the carton and automatically center the same so that the centering arms are separated only by the width of the carton, as shown in Figure 8 in which the dotted lines indicate a typical carton to be centered. The carton may be maintained in engaged position between the centering arms, as shown in Figure 8, while any type of operation is performed upon it. Also, the carton may be moved along the conveyor while the centering device holds it in position since the rollers permit such movement.

When it is desired to release or open the centering device, the switching mechanism is reversed. This reversal again evacuates the port 97 and applies high pressure through the port 98, so as to return the piston to the initial position shown in Figure 6. This completes the cycle of the centering operation.

Where it is desired, the centering device may be operated with the movement of only the front centering arm. This may be done by loosening the clamp 73 so as to release the pulley belt. Then the rear centering arm may be moved by hand to any selected position and locked in place by the setscrew 58. In this condition, the rear centering arm will act as a stationary guide or back rest upon the operation of the centering device, and the front centering arm will move toward and away from it as previously described.

It is obvious that the centering operation can be employed to center a carton at any desired widthwise position upon the conveyer roller. As shown in Figures 5 through 8, the centering would take place upon the exact center of the machine, but by loosening the clamp 73 and moving the rear centering arm a small amount to the left and then again tightening the clamp 73 a centering can be effected in the left half of the conveyer roller. Reference to Figure 5 will show that this is easily effected. Conversely, upon a loosening of the clamp 73 and a movement of the left centering arm, a small amount to the right, and upon a retightening of the clamp, a centering may be effected on the right half of the conveyer roller. This gives an adaptability to the centering device and readily shows its adaptability and means for variation.

Other variations and changes in this invention will be obvious to those skilled in the art and are to be included in the scope of the claims appended hereto.

What is claimed is:

1. A centering device for positioning articles to a desired position, said device including spaced centering arms, and means for moving said arms toward and away from one another to contact an article and thereby position it between said arms, said means including a single reciprocable power member and pulley means, said pulley means comprising a looped belt in which one side of the loop cooperates with a first one of said centering arms and the opposite side of the loop cooperates with a second one of said centering arms.

2. A centering device for positioning articles to a desired position, said device including spaced centering arms, means for supporting each of said arms upon bearing elements reciprocable upon supporting slide bars, and means for moving said arms toward and away from one another to contact an article and thereby position it between said arms, said means including a single reciprocable power member.

3. A centering device for positioning articles to a desired position, said device including spaced centering arms, means for supporting each of said arms upon bearing elements reciprocable upon supporting slide bars, and means for moving said arms toward and away from one another to contact an article and thereby position it between said arms, said means including a single reciprocable power member and pulley means, said pulley means comprising a looped belt in which one side of the loop cooperates with a first one of said centering arms and the opposite side of the loop cooperates with a second one of said centering arms.

4. A centering device for positioning articles to a desired position, said device including spaced centering arms, means for supporting each of said arms upon bearing elements reciprocable upon supporting slide bars, said supporting means further including tie members connected between said centering arms and said bearings, said centering arms including roller supports connected to said tie members in upstanding relationship, and means for moving said arms toward and away from one another to contact an article and thereby position it between said arms, said means including a single reciprocable power member.

5. A centering device for positioning articles to a desired position, said device including spaced centering arms, means for supporting each of said arms upon bearing elements reciprocable upon supporting slide bars, said bearing elements and their supporting means being adapted to move as a centering arm unit with each of said centering arms in response to the operation of a power means for moving said arms toward and away from one another to contact an article and thereby position it between said arms, said means including a single reciprocable power member.

6. A centering device for positioning articles to a desired position, said device including spaced centering arms, means for supporting each of said arms upon bearing elements reciprocable upon supporting slide bars, said bearing elements and their supporting means being adapted to move as a centering arm unit with each of said centering arms in response to the operation of a power means for moving said arms toward and away from one another to contact an article and thereby position it between said arms, said means including a single reciprocable power member and pulley means, said pulley means comprising a looped pulley belt and means connecting one side of said pulley belt to a first one of said centering arm units and the opposite side of said pulley belt loop to a second one of said centering arm units.

7. A centering device for positioning articles to a desired position, said device including spaced centering arms, and means for moving said arms toward and away from one another to contact an article and thereby position it between said arms, said means including a single reciprocable power member and pulley means cooperating with said power member, said pulley means comprising a looped belt in which one side of the loop cooperates with a first one of said centering arms and the opposite side of the loop cooperates with a second one of said centering arms, and means for varying the relative positioning of said centering arms comprising adjustment means for varying the cooperating position of said centering arms upon said pulley belt.

8. A centering device for positioning articles to a desired position upon a conveyer or the like, said device comprising a frame adapted to be associated with said conveyor, spaced centering arms adapted to move back and forth in opposed directions across said conveyor to position articles therebetween at a selected position, means for supporting each of said arms on bearing elements reciprocable upon slide bars fastened to said frame, said bearing elements and their supporting means being adapted to move as a centering arm unit with each of said centering arms in response to the operation of a power means for moving said arms toward and away from one another to contact an article and thereby position it between said arms, said means including a single reciprocable power member.

9. A centering device for positioning articles to a desired position upon a conveyer or the like, said device comprising a frame adapted to be associated with said conveyer, spaced centering arms adapted to move back and forth in opposed directions across said conveyer to position articles therebetween at a selected position, means for supporting each of said arms on bearing elements reciprocable upon slide bars fastened to said frame, said bearing elements and their supporting means being adapted to move as a centering arm unit with each of said centering arms in response to the operation of a power means for moving said arms toward and away from one another to contact an article and thereby position it between said arms, said means including a single reciprocable power member, and pulley means cooperating with said power member, said pulley means comprising a looped belt in which one side of the loop cooperates with a first one of said centering arms and the opposite side of the loop cooperates with a second one of said centering arms.

10. A centering device for positioning articles to a desired position upon a conveyer or the like, said device comprising a frame adapted to be associated with said conveyer, spaced centering arms adapted to move back and forth in opposed directions across said conveyer to position articles therebetween at a selected position, means for supporting each of said arms on bearing elements reciprocable upon slide bars fastened to said frame, said bearing elements and their supporting means being adapted to move as a centering arm unit with each of said centering arms in response to the operation of the power means for moving said arms toward and away from one another to contact an article and thereby position it between said arms, said means including a single reciprocable power member, pulley means cooperating with said power member, said pulley means comprising a looped belt in which one side of the loop cooperates with a first one of said centering arms and the opposite side of the loop cooperates with a second one of said centering arms, and stationary means attached to said frame defining the limits of said pulley belt.

11. A centering device for positioning articles to a desired position upon a conveyer or the like, said device comprising a frame adapted to be associated with said conveyer, spaced centering arms adapted to move back and forth in opposed directions across said conveyer to position articles therebetween at a selected position, means for supporting each of said arms on bearing elements reciprocable upon slide bars fastened to said frame, said bearing elements and their supporting means being adapted to move as a centering arm unit with each of said centering arms in response to the operation of the power means for moving said arms toward and away from one another to contact an article and thereby position it between said arms, said means including a single reciprocable power member, pulley means cooperating with said power member, said pulley means comprising a looped belt in which one side of the loop cooperates with a first one of said centering arms and the opposite side of the loop cooperates with a second one of said centering arms, stationary means attached to said frame defining the limits of said pulley belt, and means for varying the positioning of the article by said centering arms comprising means adjustably connecting said centering arm units to said pulley belt.

12. A centering device for positioning articles to a desired position, said device including spaced centering arms, and means for moving at least one of said arms toward and away from another to contact an article and thereby position it between said arms, said means including a single reciprocable power member directly connected to a first one of said centering arms and disengageable pulley means between said first centering arm and a second centering arm.

13. A centering device for positioning articles to a desired position, said device including spaced centering arms, and means for moving at least one of said arms toward and away from another to contact an article and thereby position it between said arms, said means including a single reciprocable power member directly connected to a first one of said centering arms and disengageable pulley means between said first centering arm and a second centering arm, said second centering arm being adapted to be locked in a selected position when said pulley means is disengaged.

14. A centering device for positioning articles to a desired position, said device including spaced centering arms, means for supporting each of said arms on bearing elements reciprocable upon supporting slide bars, said bearing elements and their supporting means being adapted to move as a centering arm unit with each of said centering arms in response to the operation of a power means for moving said arms toward and away from one another to contact an article and thereby position it between said arms, said means including a single reciprocable power member connected to a first one of said centering arm units, and disengageable pulley means between said first centering arm and a second centering arm, said pulley means comprising a looped pulley belt and means disengageably connecting one side of said pulley belt to a first one of said centering arm units and the opposite side of said pulley belt loop to a second one of said centering arm units whereby said first centering arm unit may upon disengagement of the pulley belt be operated independently of said second centering arm unit.

15. A centering device for positioning articles to a desired position, said device including two opposed and spaced centering arms, means for moving a selected number of said arms toward and away from one another to contact an article and thereby position it between said arms, said means including a single reciprocable power member connected to a first one of said arms, and means for varying the relative positioning of said centering arms when said selected number is two, and means for locking a second centering arm in a selected position when said selected number is one.

References Cited in the file of this patent
UNITED STATES PATENTS

| 1,605,984 | Podel | Nov. 9, 1926 |
| 2,602,554 | Griffith | July 8, 1952 |
| 2,641,371 | Webster | June 9, 1953 |